US008712829B2

(12) United States Patent
Runbeck et al.

(10) Patent No.: US 8,712,829 B2

(45) Date of Patent: Apr. 29, 2014

(54) METHOD OF OPERATING AN ELECTION BALLOT PRINTING SYSTEM

(76) Inventors: Robert K. Runbeck, Paradise Valley, AZ (US); Valentino F. Guyett, Olympia, WA (US); John W. Latsko, Chandler, AZ (US)

( * ) Notice: Subject to any disclaimer, the term of this patent is extended or adjusted under 35 U.S.C. 154(b) by 21 days.

(21) Appl. No.: 13/021,033

(22) Filed: Feb. 4, 2011

(65) Prior Publication Data

US 2011/0122444 A1 May 26, 2011

Related U.S. Application Data

(60) Division of application No. 12/055,308, filed on Mar. 25, 2008, and a continuation of application No. 12/055,288, filed on Mar. 25, 2008, and a continuation of application No. 12/055,293, filed on Mar. 25, 2008, now Pat. No. 7,883,014.

(60) Provisional application No. 60/908,141, filed on Mar. 26, 2007.

(51) Int. Cl.
*G06F 11/00* (2006.01)

(52) U.S. Cl.
USPC ................................ 705/12; 235/51; 235/386

(58) Field of Classification Search
USPC ...................................... 705/12; 235/51, 386
See application file for complete search history.

(56) References Cited

U.S. PATENT DOCUMENTS 6,250,548 B1 * 6/2001 McClure et al. ................ 235/51
2006/0053084 A1 * 3/2006 Haas et al. .................... 705/410

OTHER PUBLICATIONS

Daniel Sandler, Kyle Derr, and Dan Wallach, "VoteBox: a tamper-evident, verifiable electronic voting system", all pages, date unknown.*

* cited by examiner

*Primary Examiner* — Calvin Cheung
(74) *Attorney, Agent, or Firm* — Schmeiser, Olsen & Watts LLP

(57) ABSTRACT

A method includes receiving a voter list, and receiving a plurality of different types of ballot images. The method includes using a control program to form a side file which associates the ballot images with the voter list, wherein the control program selects a ballot image which corresponds to a selected voter of the voter list. The method includes forming a print job which includes the selected ballot image, and printing the print job to form an unused ballot which includes the selected ballot image. The method includes comparing an image of the unused ballot with the selected ballot image.

18 Claims, 10 Drawing Sheets

METHOD OF OPERATING AN ELECTION BALLOT PRINTING SYSTEM

This application is a divisional of, and claims the benefit of, U.S. patent application Ser. No. 12/055,308 to Runbeck, et al., which was filed on Mar. 25, 2008, the contents of which are incorporated by reference as though fully set forth herein.

U.S. patent application Ser. No. 12/055,308 claims the benefit of U.S. Provisional Application No. 60/908,141 to Runbeck, et al., filed on Mar. 26, 2007, the contents of which are incorporated by reference as though fully set forth herein.

This application is a continuation of, and claims the benefit of U.S. patent application Ser. No. 12/055,288 to Runbeck, et al., which was filed on Mar. 25, 2008, the contents of which are incorporated by reference as though fully set forth herein.

This application is a continuation of, and claims the benefit of U.S. patent application Ser. No. 12/055,293, now U.S. Pat. No. 7,883,014 to Runbeck, et al., which issued on Feb. 8, 2011, the contents of which are incorporated by reference as though fully set forth herein.

BACKGROUND OF THE INVENTION

1. Field of the Invention

This invention relates to methods of providing ballots.

2. Description of the Related Art

It is generally not known before an election the number of people who will vote, as well as their identity. Hence, a large number of ballots are often printed before an election in the hope that there will be enough ballots for all of the voters. Providing enough ballots for all of the voters is difficult because the ballots are not all the same. For example, the ballots can be different for different political parties, such as Independent, Democrat and Republican. The ballots can be different for different geographical locations, such as different counties, cities and states. Further, it is often necessary to provide ballots in different languages (i.e. English and Spanish) because voters typically understand different languages. The ballots can even be different for different elections, such as state and national elections.

To better illustrate the problem, consider an election which has 10,000 registered voters. In this situation, it is typical to print and distribute about 50,000 ballots with the hope that the correct ballot will be available for each voter. For example, if one voter speaks Spanish and is a Republican, then he or she will need to be provided with a ballot written in Spanish that corresponds with a ballot for the Republican Party. Hence, the ballot must be the correct ballot for the person requesting it.

The ballots are distributed to different voting sites around the location that the election will take place. It can be appreciated that it is difficult and time consuming to print and distribute a large number of ballots, and it would be much easier to print a distribute a smaller number of them. Further, once the ballots are at the voting site, it is difficult and time consumer to find the correct ballot for the voter. Some voters may not be able to vote if the voting site runs out of the correct ballots, or if the correct ballot cannot be found.

Ballots that are printed for the election and not used are typically discarded after the election. Discarding unused ballots is wasteful and expensive, so it is desirable to reduce this occurrence.

BRIEF SUMMARY OF THE INVENTION

The present disclosure is generally directed to a method of operating an election ballot printing system. The drawings and the following description provide an enabling disclosure and the appended claims particularly point out and distinctly claim disclosed subject matter and equivalents thereof.

DETAILED DESCRIPTION OF THE INVENTION

Figure 1:
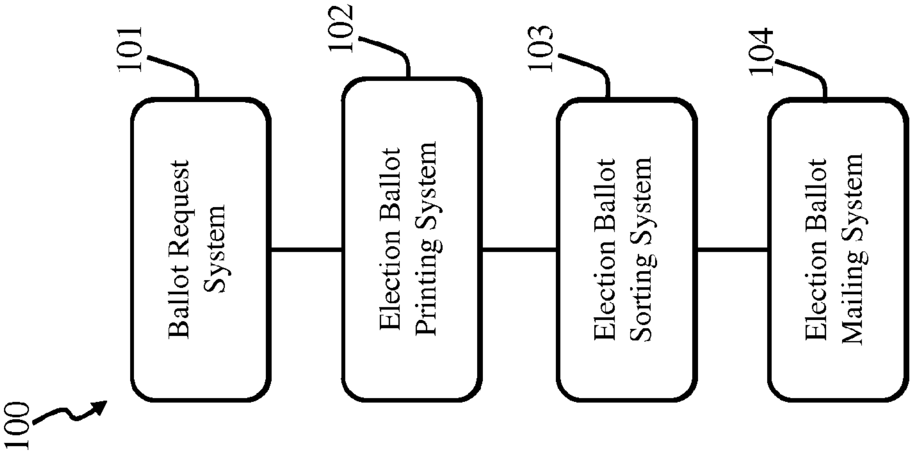
FIG. 1 is a block diagram of an election system.

FIG. 1 is a block diagram of an election system 100. In this embodiment, election system 100 includes a ballot request system 101 and election ballot printing system 102. Ballot request system 101 can provide many different types of information, such as a precinct list, voter list and ballot file. Ballot request system 101 provides an order for a desired type and number of ballots to election ballot printing system 102, wherein election ballot printing system 102 prints the desired type and number of ballots in response. A printed ballot correspond to an unused ballot. An unused ballot is one that is unmarked, such as by a voter, and does not indicate the voter's selection. Hence, a used ballot is one that is marked by a voter to indicate the voter's selection.

In this embodiment, election system 100 includes an election ballot sorting system 103 and election ballot mailing system 104. Election ballot sorting system 103 sorts the printed ballots provided by election ballot printing system 102 and election ballot mailing system 104 mails the printed ballots to a desired location. In this way, election system 100 is useful for providing, sorting and mailing unused election ballots. Further, election system 100 is useful for providing, sorting and mailing unmarked election ballots. It should be noted that the operation of election system 100 is facilitated by using software. For example, election ballot printing system 102 includes a computer operatively coupled with a printer, wherein the computer and printer are operated with a control program, as discussed in more detail below.

There are many different types of election ballot ordering, sorting and mailing systems that can be included with election system 100. For example, Pitney Bowes, Inc. provides a mail sorting system, such as the one disclosed in U.S. Patent Application No. 20060049252. More information regarding various components of election ballot printing system 102 can be found in U.S. patent application Ser. No. 12/055,303, entitled ELECTION BALLOT PRINTING SYSTEM AND METHOD, U.S. Pat. No. 7,883,014, entitled ACCEPTANCE TRAY FOR AN ELECTION BALLOT PRINTING SYSTEM, and U.S. patent application Ser. No. 12/055,288, entitled FEED TRAY EXTENSION FOR AN ELECTION BALLOT PRINTING SYSTEM, each being filed on Mar. 25, 2008, by the same inventors, the contents of each of which are incorporated by reference as though fully set forth herein.

In general, election ballot printing system 102 is a certified ballot printing system which can output hard copies of ballots, as well as soft copies. For example, the hard copy of the ballot is a printed ballot which includes a ballot image. The printed ballot includes the ballot image because it displays the ballot image. The printed ballot is typically printed on paper, so that the paper displays the ballot image. The soft copy of the ballot is an image of the ballot displayed by a display device, such as a computer monitor. The image of the ballot can be in many different file formats, such as a Portable Document Format (PDF) file format. It should be noted that the ballot image corresponds to an unused ballot image. An unused ballot image is one that is unmarked, such as by a voter, and does not indicate the voter's selection. Hence, a used ballot image is one that is marked by a voter to indicate the voter's selection.

It should be noted that it is desirable to increase the number of ballots that can be printed in a given amount of time by election system 100. More election ballots can be printed in the given amount of time in many different ways. In one way, it is determined which precincts need ballots, as well as the number of ballots needed for each precinct. The ballots for each precinct are generally represented by separate computer files in a PDF file format. The separate computer files for the desired precincts are used to create a primary computer file which is the concatenation of the separate computer files. In this way, a primary computer file is created that includes all of the ballots from the desired precincts. This primary computer file is then printed as a single print job, instead of separate print jobs for the computer files corresponding to each ballot. By printing a single primary computer file instead of multiple computer files, the ballots are printed faster.

Another way the ballots can be printed faster is by processing the differences in ballots that are being printed. For example, if the ballots from different precincts have one feature that is different, then this one feature is processed instead of all of the features. By processing the one feature instead of all of them, less computer processing power is required and the ballots can be printed faster. It should be noted that the processing is implemented by the control program of election system 100, as will be discussed in more detail presently.

Election ballot printing system 102 is computer operated. Election ballot printing system 102 can be computer operated in many different ways, such as by including the control program which operates the computer. The control program is often provided to the computer in the form of software. The software operated by election ballot printing system 102 can include many different components. For example, the software typically includes a Production Software (PS) program. In one embodiment, the PS program receives an absentee request file from a voter registration (VR) system and, in response, a matching print stream of ballots is provided. The voter registration system can be of many different types, such as the voter registration of a state, city and county, among others. The PS program generates a Print Audit File (PAF) that is used to verify the accuracy of the print stream, as well as monitor and report on ballot printing activity. The PS program is installed on the computer of system 102 when a customer utilizes more than one printer.

The software operated by election ballot printing system 102 can include an Early Voting Software (EVS) program. The EVS program is designed to receive individual ballot requests from the VR system, such is in an early voting environment or in-person absentee requests. The EVS program prints a desired ballot for that request in response to receiving the ballot request. The EVS program also generates a PAF, and provides a report corresponding to the print status of a received request, if desired. In some embodiments, the report corresponds to the print status of every received request and, in other embodiments, the report corresponds to the print status of selected received requests.

The software operated by election ballot printing system 102 can include an Audit System (AS) program. The AS program operates a scanning device which scans each ballot that is outputted by election ballot printing system 102. The scanning device can be of many different types, such as a camera, video camera and bar code reader, among others. In one mode of operation, the AS program compares print output information and expected output information and determines whether or not they correspond. The print output information is information from a printed ballot determined by the scanning device, and the expected output information is information from a soft copy of the ballot to be printed.

In normal operation, the print and expected output information corresponds with each other. When the print and expected output information do not correspond with each other, an error indication is provided wherein the error indication indicates that there is a printing error. For example, the error indication is provided when a bar code printed on the ballot does not correspond with a bar code of the soft copy of the ballot. A visual indication of the error indication is typically displayed using a display included with election ballot printing system 102 so that the user can see it. Information corresponding to the error indication is provided to the Print Audit File of the PS program. It should be noted that the print and expected output information can not correspond with each other in many different ways. For example, there can be a ballot that is not printed (i.e. missing ballot), there can be a duplicate ballot that is printed, and there can be printing errors on the printed ballot (i.e. inaccuracies in the print output information).

The software operated by election ballot printing system 102 can include other software programs, if desired. For example, software operated by election ballot printing system 102 can include software for reading, creating and/or editing a PDF file, such as ADOBE READER and ADOBE ACROBAT, among others. Further, software operated by election ballot printing system 102 can include software for editing text files, such as WORD, EXCEL, WORDPAD, NOTEPAD, and TEXTPAD, among others. Software operated by election ballot printing system 102 can also include security software, such as AVG Anti-Virus software. It should be noted that the software operated by election ballot printing system 102 can be operated on many different operating systems, such as those provided by MICROSOFT. One particular operating system that can be utilized is the MICROSOFT WINDOWS XP operating system.

The software operated by election ballot printing system 102 can include a Repository Manager Tool (RMT) that is used to provide desired print functions. For example, the RMT can provide print functions that are typically performed during the offset printing process. These print functions typically include the electronic cropping of ballots, the addition and/or adjustment of ballot styles, the addition and/or adjustment of precinct identifiers, the application of color bars and/or security seals, among others. These print functions are typically not available through a voter registration system's ballot printing system. The RMT also provides security for the soft copies of the ballots while stored by election ballot printing system 102. For example, the RMT can encrypt the soft copies of the ballots to make it more difficult for an unauthorized user to access them. It should be noted that, in some embodiments, the RMT is not installed with election ballot printing system 102 and, instead, the security is provided off-site at a more secure location.

Figure 2:
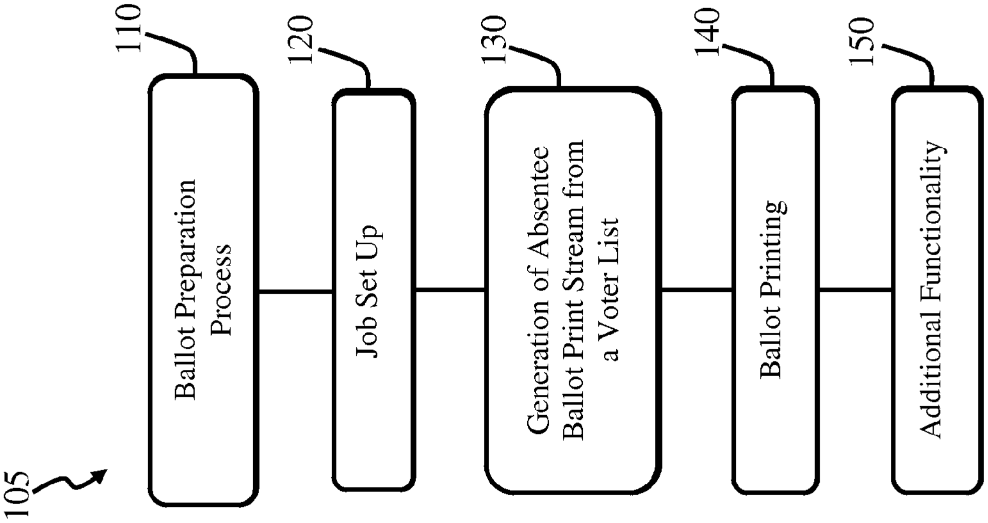
FIG. 2 is a flow diagram of a method of operating an election ballot printing system included with the election system of FIG. 1.

FIG. 2 is a flow diagram of a method 105 of operating election ballot printing system 102. In this embodiment, method 105 includes a ballot preparation process step 110, wherein soft copies of the ballots are prepared, and a job set-up step 120, wherein the soft copies of the ballots are prepared for printing in a print job. Method 105 includes a step 130 of generating an absentee ballot print stream from a voter list, and a step 140 of printing the ballots of the print job. In some embodiments, method 105 includes a step 150 of providing additional functionality, such as reprinting one or more ballots.

Figure 3:
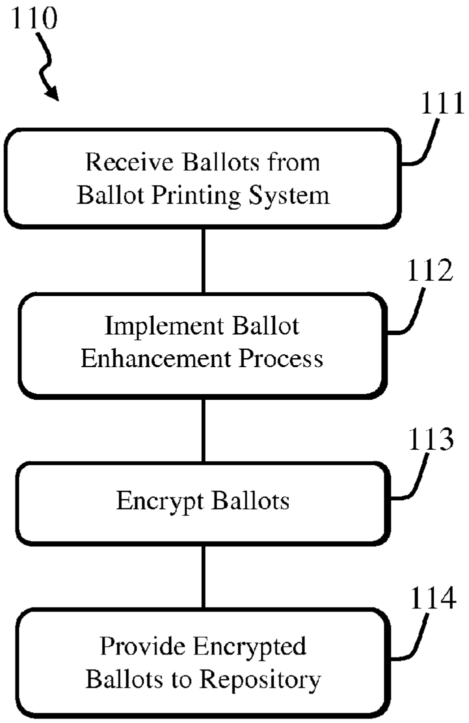
FIG. 3 is a flow diagram of one embodiment of a ballot preparation step of the method of FIG. 2.

FIG. 3 is a flow diagram of one embodiment of ballot preparation step 110. In this embodiment, ballot preparation step 110 includes a step 111 of receiving ballots from a ballot printing system. The ballot printing system can be of many different types, but it is typically a certified system operated by a customer who desires ballots. The ballot printing system is certified to increase the likelihood that the ballots generated are authentic so that the integrity of the election is preserved.

Ballot preparation step 110 includes a step 112 of implementing a ballot enhancement process to the soft copy of the ballot. The ballot enhancement process enables a user to electronically apply typical print overlays that are currently included with the finishing process. The ballot enhancement process can enhance the ballots in many different ways. For example, the ballot enhancement process can crop the soft copies of the ballots so they are a desired size. The size of the soft copy of a ballot typically corresponds to a number of pixels. The ballot enhancement process can include the application of color bars and security seals to the soft copy of the ballot. The ballot enhancement process can include the appending of a ballot style and precinct numbers, stub serial numbers, and other allowable data, to the soft copy of the ballot. The ballot enhancement process can include appending a Key ID to the soft copy of the ballot for audit purposes. It should be noted that the soft copies of the ballots of step 112 are typically provided to the customer requesting them so they can be checked for errors.

Ballot preparation step 110 includes a step 113 of encrypting the soft copies of the ballots. It is more difficult to access the soft copies of the ballots in response to encrypting them. Hence, it is more difficult to make unauthorized changes to the soft copies of the ballots in response to encrypting them.

Ballot preparation step 110 includes a step 114 of providing the encrypted ballots to a repository. The ballots are provided to the repository so they can be safely stored for later use. The repository can be of many different types, such as a computer storage device, like a hard drive.

Figure 4:
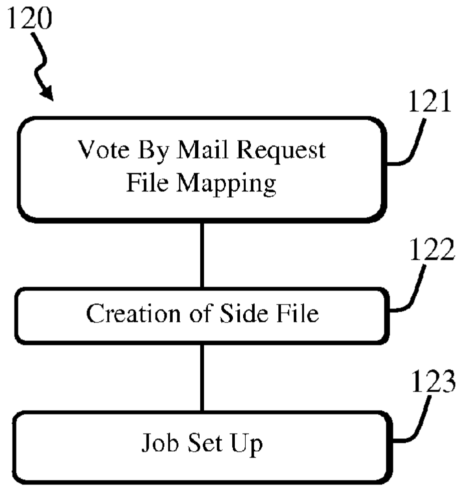
FIG. 4 is a flow diagram of a job set up step of the method of FIG. 2.

FIG. 4 is a flow diagram of job set up step 120. In this embodiment, step 120 includes a step 121 of file mapping the vote by mail (VBM) request. In this process, an example of a customer's VBM request file is received prior to each election. The PS software allows the user to identify the field, or combination of fields (referred to as a Key ID) that will directly correlate to a specific PDF file. Example fields can include the precinct, the precinct and party, and the ballot style and language.

Step 120 includes a step 122 of creating a side file. The side file can be created in many different ways, such as manually. One way the side file is created manually is by entering its data into a software program, such as text editing software like WORD and EXCEL. The side file is stored so that election ballot printing system 102 can access it with its control program. The side file allows the PS software to perform many different functions. For example, the side file allows the PS software to correlate a specific .PDF file with a key identifier (i.e. Key ID). A Key ID is a specific sequence of characters that when joined together tell the control program which .PDF files to print on the fronts and backs of each requested ballot. The side file also allows unique audit information corresponding to each ballot to be scanned for verification. The audit information can be of many different types, such as an identification given to each ballot.

Step 120 includes a step 123 of setting up the job. In most situations, previous to step 123, VBM file formats have been saved. Soft copies of ballots can be accessed by the election system and the side file that links the two together is established. The election system then allows users to set up a print job in response to many different variables. For example, the variables can include the identity of the VBM format to use, the identity of the side file to use, the identify of the location of the PDF files to be used, the identify of the printers to be used and the identity of the segment breaks which allow users to separate large files into groups of smaller segments.

The variables can also include a request for the creation of header or trailer pages for each job and a request for the creation of precinct or ballot style separators for each job. The variables can include the identity of information to be overlaid on the ballot. The overlayed information can include many different types of information, such as the ballot style and precinct numbers, stub serial numbers, and other desired information. The overlayed information can also include the ballot identification, such as ABSENTEE, VOTE BY MAIL, OFFICIAL BALLOT, etc.

Figure 5:
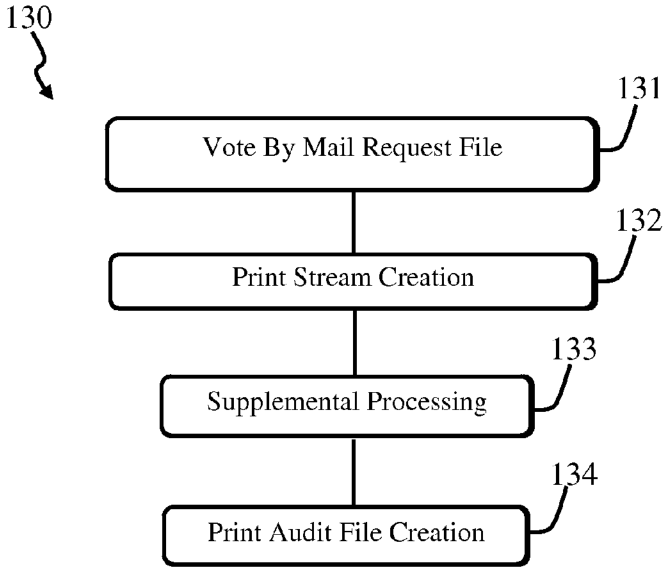
FIG. 5 is a flow diagram of a step of generating a ballot print stream of the method of FIG. 2.

FIG. 5 is a flow diagram of step 130. In this embodiment, step 130 includes a step 131 of receiving a vote by mail request file. The vote by mail request file is typically received when the system is ready to process VBM request files for printing. A specific folder of the PS system, called the Active VR folder in this example, is designated for placement of files from the voter registration system. The user selects a request file to process. The PS software moves this file to an archive directory, and then processes it.

Step 130 includes a step 132 of creating a print stream. In response to processing the request file, the PS software parses each record to obtain the Key ID information. The side file is then accessed to in order to determine which files are needed. The result is a print stream which includes a number of PDF files corresponding to the ballots. In most situations, the print stream includes the exact number of PDF files for each ballot request. Further, in most situations, the PDF files for each ballot request are in the order of the request file.

Step 130 includes a step 133 of performing supplemental processing. The supplemental processing can provide many different functions. For example, the print stream can be separated into separate specified segments. The print stream can have job header or trailer pages inserted into it. The job header and trailer pages can include many different types of information, such as the file name, job name and total number of pages in the job, among others.

Step 130 includes a step 134 of creating the print audit file. The PS software generates a Print Audit File (PAF) that identifies each individual page to be printed as part of that job. The PAF is typically generated by the PS software after the entire print stream is complete. Further, the PAF includes the identity of each individual page to be printed in the order they are to be printed.

Figure 6:
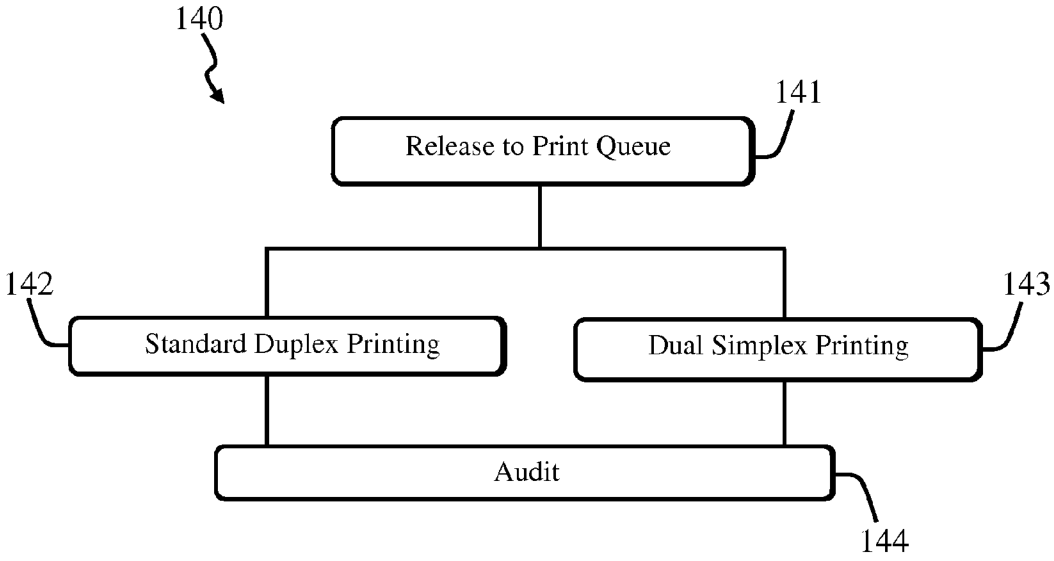
FIG. 6 is a flow diagram of a ballot printing step of the method of FIG. 2.

FIG. 6 is a flow diagram of ballot printing step 140. In this embodiment, step 140 includes a step 141 of releasing the print job to the print queue so it can be printed. One or more print jobs have been created in response to the original request file, wherein the print job(s) reside in the PS output queue awaiting release. The user can select a print job to print, and direct it to a selected printer. Upon release, both the PDF print stream and accompany Print Audit File are transferred to the selected printer.

The print job can be printed in many different ways. For example, in a step 142, the print job is printed using standard duplex printing. Standard duplex printing involves the printer automatically printing on both sides of the ballot using an internal print functionality. Standard duplex printing is useful for ballot stock up to 90# in weight (ES&S and Premier), and for ballot lengths up to 18".

In a step 143, the print job is printed using dual simplex printing. In dual simplex printing, the printer only prints one side at time. After the completion of printing one side of a request file, the printed stack of ballots is flipped over, and reloaded into the printer, so that the other side can be printed. Dual simplex printing is useful for paper weights over 90# (Sequoia) and for ballot lengths over 18".

Step 140 includes a step 144 of auditing the print job. Any page exiting the printer can be scanned by the scanning device at the output of election ballot printing system 102. The two printing modes, however, have different functionality for their audits. For example, for standard duplex printing, the primary function of this audit is to verify that every ballot present in the print stream was actually printed. The scanning device scans the Key ID information on each ballot, and compares this to the expected output. Any discrepancies are identified real time on the display device of election ballot printing system 102, which allows the user to research and reconcile any errors in a print run.

Dual simplex printing includes the same functionality described above for standard duplex printing. However, the use of dual simplex printing introduces possible printing errors, such as the improper reloading of ballots, ballots being out of order when printing their second side, as well as missing ballots when printing their second side.

Hence, the audit functionality in dual simplex printing includes the scanning of both the front and back sides of the ballot to verify the accuracy of the print. If an error is detected, the ballot is automatically diverted into a secured bin, and that specific ballot is noted as rejected and queued for reprint. More information regarding diverting a ballot to a secure bin is provided in U.S. Pat. No. 7,883,014, filed on an even date herewith, by the same inventors.

Figure 7:
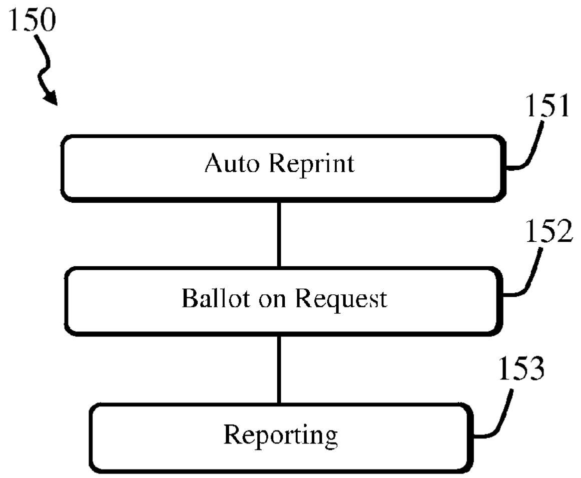
FIG. 7 is a flow diagram of a step of providing additional functionality of the method of FIG. 2.

FIG. 7 is a flow diagram of step 150 of providing additional functionality. In this embodiment, step 150 includes a step 151 of reprinting. At the close of a print job, a reprint file is created for ballots identified as missing or having errors. The user can then release this file to print so that the missing ballots and ballots with errors are printed. These ballots are processed and audited in the same manner as described above. In most situations, a print job is not considered complete until every ballot from the original job has been shown as being successfully printed.

Step 150 includes a step 152 of providing a ballot on request. In addition to automatically generating batch files of ballots, the PS software allows for the printing of ballots on a request basis. The printing of ballots on a request basis is useful for many different reasons. For example, it allows for damaged ballots to be manually reprinted. Its also allows for duplicate ballots to be printed, such as when one ballot is damaged or unreadable. When a ballot is damaged or unreadable, the scanning device may not be able to scan it. The printing of ballots on a request basis is useful so that more precinct ballots can be printed, such as when a small volume of ballots is desired. For example, a small number of ballots can be desired when there is a shortage of them.

For security purposes, the ability to print ballots on a request basis can be restricted. The ability to print ballots on a request basis can be restricted in many different ways, such as by requiring user authentication. In some situations, a selected user is provided with the user authentication. The selected user can be many different users, such as a supervisor and/or administrator. In this way, the likelihood of an unauthorized user printing ballots on a request basis is reduced, which preserves the integrity of the election.

Step 150 includes a step 153 of reporting the print job. In this embodiment, there are two levels of reporting. One level of reporting involves providing summary reports which include status information for each print job and associated reprint jobs generated by the system. Reports can be sorted in many different ways, such as by date, user and job or file name, among others. Another level of reporting involves providing detailed reports which include details regarding a specific number of pieces per Key ID in each job, and their status. This is useful in understanding the contents of each file, and their print status.

There are several different print statuses that can be provided. For example, one print status is an On Hold print status wherein a file has been generated but not yet released to the printer. A Released print status indicates that the job has been released to the printer, but it is not entirely shown by the audit. A Printed status indicates that all of the ballots have been accounted for as printed.

Figure 8:
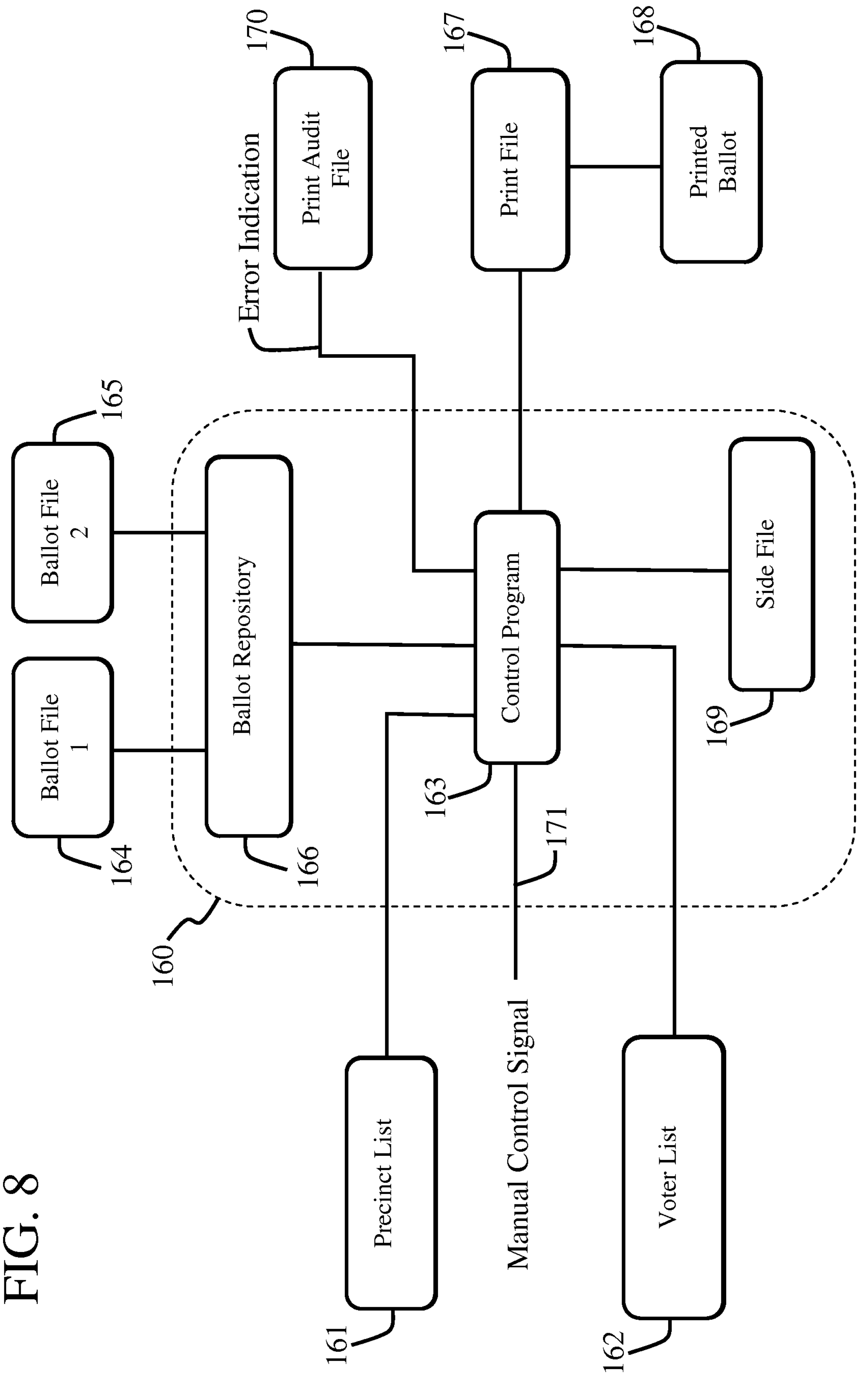
FIG. 8 is a block diagram of an election ballot printing system.

FIG. 8 is a block diagram of an election ballot printing system 160. It should be noted that election ballot printing system 160 can be included with election system 100 of FIG. 1. In this embodiment, election ballot printing system 160 includes a computer (not shown) which is operated by control program 163. Printing system 160 includes a ballot repository 166 stored by the computer for receiving one or more ballot files, wherein each ballot file includes a corresponding ballot image. It should be noted that the different files and lists controlled and accessed by control program 163 are generally stored with a computer memory in communication with the computer of system 160.

The operation of printing system 160 can be facilitated by including one or more of the software components discussed in more detail above. Examples of the software components include the Production Software (PS) program, Early Voting Software, Audit System program and Repository Manager Tool. These software components are provided by Runbeck Election Services of Tempe, Ariz. Further, the operation of printing system 160 can involve one or more of the steps in the methods discussed herein.

Control program 163 has access to a precinct list 161, which includes a list of the precincts to be included with the election. FIG. **9*a* shows one example of precinct list 161, which includes Precinct 1, Precinct 2, Precinct 3, . . . , Precinct N, wherein the number N corresponds to the number of precincts included with the election. In general, the precinct list includes one or more precincts listed therein. It should be noted that precinct list 161** is typically included with a side file.

Figure 9A:
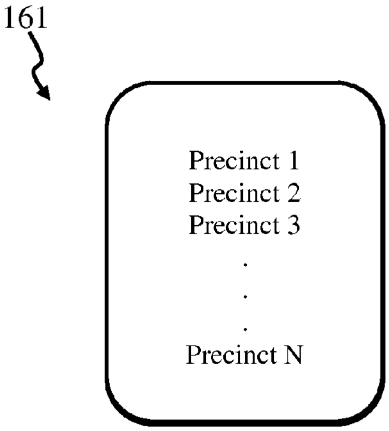
FIG. 9*a* is a diagram of a precinct list.
Figure 9B:
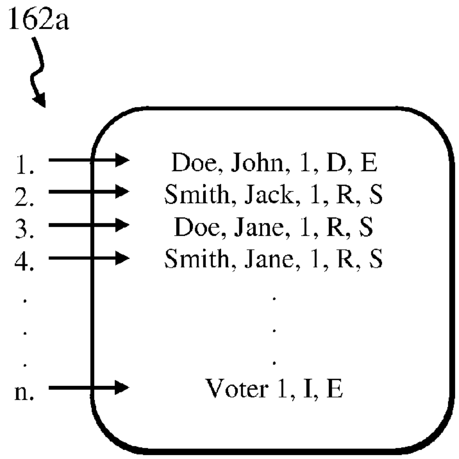
FIGS. 9*b* and 9*c* are diagrams of voter lists.
Figure 9C:
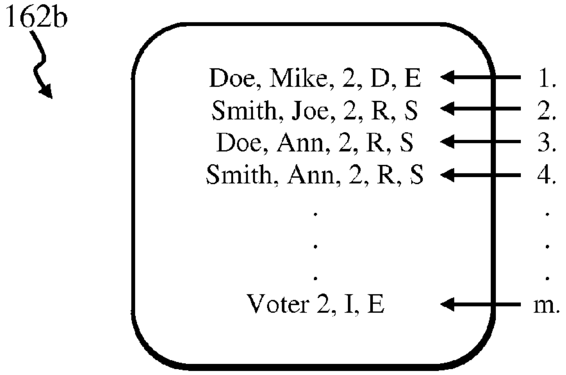

Control program 163 has access to one or more voter lists. In this embodiment, computer program 163 has access to voter lists 162*a* and 162*b*, which each includes a list of the voters eligible to vote with the election in Precincts 1 and 2, respectively. FIG. 9*b* shows one example of voter list 162*a*, which includes Voter 1, Voter 2, Voter 3, Voter 4 . . . , Voter n, wherein the number n corresponds to the number of eligible voters in Precinct 1. FIG. 9*c* shows one example of voter list 162*b*, which includes Voter 1, Voter 2, Voter 3, Voter 4 . . . , Voter m, wherein the number m corresponds to the number of eligible voters in Precinct 2. Voter lists 162*a* and 162*b* can be of many different types, such as voter registration files. Voter lists 162*a* and 162*b* are typically provided by an entity that is controlling the election, such as a state or city government.

Voter lists 162*a* and 162*b* can include many different types of information, which is generally provided in key identifiers (i.e. Key ID). In this example, the key identifiers are comma delimited, although they can be tab delimited. Here, the key identifiers include the last name of the voter followed by the voter's first name. The key identifiers also include the precinct number the voter belongs to, as well as the political party and their language preference. In this example, the voters of voter lists 162*a* and 162*b* can be Democrats (D), Republicans (R), Independents (I). Further, the language preferences for the voters of voter lists 162*a* and 162*b* are English (E) and Spanish (S). Further, the precinct identifier (i.e. Precinct 1 or 2) is indicated by the number after the voter's first name and before the indication of the political party. For example, in precinct file 162*a*, the first voter is named "John Doe" and is an English speaking Democrat in Precinct 1. Further, in precinct file 162*b*, the first voter is named "Mike Doe" and is an English speaking Democrat in Precinct 2.

In general, the key identifiers can be of many different types. For example, in some embodiments, the key identifiers are selected from a group of key identifiers which include a political party, precinct, residence, election type and language preference.

Control program 163 has access to a ballot repository 166, which includes a list of the ballot files for use with the election, wherein the ballot files include different ballot images. FIG. 9*c* shows one example of ballot repository 166, which includes Ballot File 1, Ballot File 2, Ballot File 3, Ballot File 4 . . . , Ballot File M, wherein the number N of ballot files typically corresponds with the number of precincts of precinct list 161. It should be noted that only ballot files 1 and 2 are shown in FIG. 8 and are denoted as elements 164 and 165, respectively.

Control program 163 has access to a side file 169, which associates voter list 162 with the ballot files of ballot repository 166. Side file 169 can associate voter list 162 with the ballot files of ballot repository 166 in many different ways. In one embodiment, side file 169 associates each voter in voter list 162 with the correct ballot file of ballot repository 166. The correct ballot file of ballot repository 166 for each voter in voter list 162 corresponds with the ballot he or she will use to vote. It should be noted that, in some embodiments, side file 169 associates the ballot files of ballot repository 166 with the voters of voter list 162.

Figure 9D:
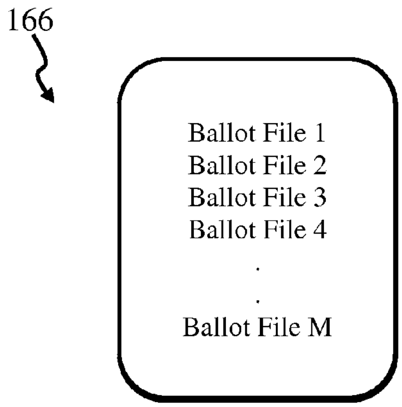
FIGS. 9*d* and 9*e* are diagrams of a ballot repository and side file, respectively.
Figure 9E:
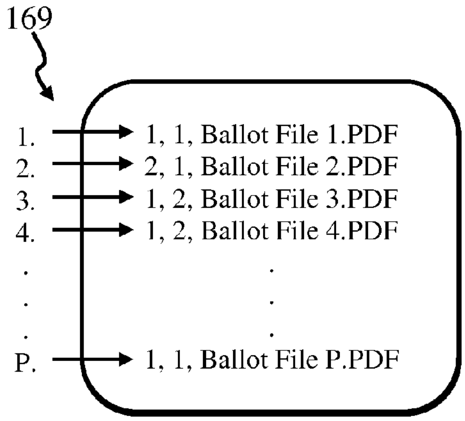

FIG. 9*d* shows one example of side file 169, which includes Side File Line 1, Side File Line 2, Side File Line 3, Side File Line 4 . . . , Side File Line P, wherein the number P corresponds to the number of different types of ballots available to the eligible voters. For example, one type of ballot can be for a voter in Precinct 1 who is Republican and speaks English, and another type of ballot can be for a voter in Precinct 2 who is Democrat and speaks Spanish. In general, the number of lines included with side file 169 depends on the number of precincts included with the election, the number of different political parties eligible to vote, as well as the number of different languages the ballots are capable of being printed in. It should be noted that the number M is often equal to the number P so that the number of ballot files of ballot repository 166 equals the number of different types of ballots available to the eligible voters.

In this example, the number in the first key identifier of each side file line corresponds with the precinct number and the second number corresponds to the number of sides the ballot is to be printed on. For example, the number 1 in the second key identifier corresponds to a single sided ballot, wherein indicia is printed on one side of the ballot, but not the other. Further, the number 2 in the second key identifier corresponds to a double sided ballot, wherein indicia is printed on both sides of the ballot. As mentioned above, precinct file 161 can be separate from side file 169, or it can be included with side file 169.

In operation, ballot files 164 and 165 are provided to election ballot printing system 160, wherein ballot files 164 and 165 include different types of ballot images. For example, the image of ballot file 164 can be of a ballot for an English speaking Democrat in Precinct 1 and the image of ballot file 165 can be for a Spanish speaking Democrat in Precinct 2.

Further, side file 169 is formed and provided to election ballot printing system 160. As mentioned above, side file 169 associates voter lists 162*a* and 162*b* with ballot images of ballot files, such as ballot files 164 and 165. For example, Side File Line 1 of side file 169 associates Ballot File 1 (denoted as element 164 in FIG. 8 and called Ballot File 1.PDF in side file 169), with Precinct 1, wherein the ballots of Precinct 1 associated with Ballot File 1 are to be printed on one side of the paper because the number in the second key identifier is one. Hence, the ballots of Ballot File 1 of Precinct 1 are printed so they are single sided.

Further, Side File Line 2 of side file 169 associates Ballot File 2 (denoted as element 165 in FIG. 8 and called Ballot File 2.PDF in side file 169) with Precinct 2, wherein the ballots of Precinct 2 associated with Ballot File 2 are to be printed on one side of the paper because the number in the second key identifier is one. Hence, the ballots of Ballot File 2 of Precinct 1 are printed so they are single sided. In this way, side file 169 associates ballot images of ballot files 164 and 165 with precinct list 161. It should be noted that the information of the .PDF files named in side file 169 is the image of the corresponding ballot to be printed.

It should be noted that control program 163 can store an indication of the type of ballot which corresponds with a selected precinct of precinct list 161 in side file 169. Further, control program 163 can select the type of ballot image included with print file 167 in response to an indication from side file 169. Control program 163 can select the type of ballot image in response to a key identifier of voter lists provided to election ballot printing system 160.

Figure 9F:
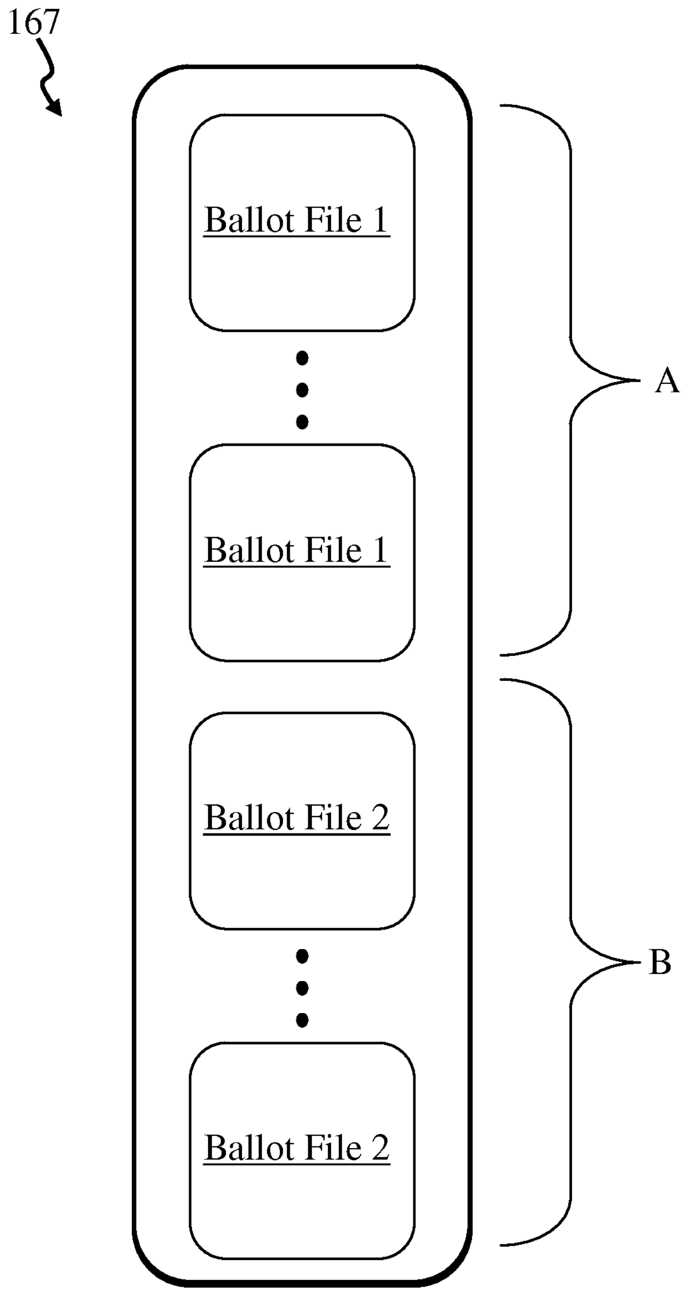
FIG. 9*f* is a diagram of a print file.

Voter lists 162*a* and/or 162*b* are provided to election ballot printing system 160. Control program 163 accesses side file and, in response, selects the ballot image in ballot files 164 and 165 which corresponds to a selected voter of voter lists 162*a* and/or 162*b*. Control program 163 forms a print file 167 which includes the selected ballot images from ballot files 164 and/or 165. An example of print file 167 is shown in FIG. 9*f*. In response to printing print file 167, the printer of system 160 prints the selected ballot images on paper and one or more printed ballots 168 are provided. Print file 167 is printed in response to control program 163 sending a print signal to the printer of system 160. Control program 163 can include a number of ballot images in print file 167 which corresponds with the number of voters included with voter lists 162*a* and/or 162*b*.

In operation, control program 163 reads a desired one of voter lists 162*a* and 162*b*. For example, when control program 163 reads voter list 162*a*, it determines that the first voter listed (i.e. "John Doe"), desires a ballot for a Democrat of Precinct 1 printed in English. Control program 163 reads side file 169 and determines that the corresponding ballot image is indicated in Side File Line 1 and is named Ballot File 1.PDF. Control program 163 flows the image associated with Ballot File 1.PDF, which is stored in ballot repository 166 in ballot file 164, to print file 167. Control program 163 reads the rest of the voters in voter list to determine which ones desire the same ballot as the first voter. Control program 163 copies the image associated with Ballot File 1.PDF in print file 167 so that the number of images associated with Ballot File 1.PDF in print file 167 corresponds with the number of voters in precinct list 162*a* who desire this type of ballot. For example, if the number of voters of Precinct List 162*a* that desire ballot file 164 is A, then the number of images corresponding to ballot file 164 in print file 167 is A, as shown in FIG. 9*f*.

Control program 163 determines the number of other types of ballot images needed in print file 167 for the voters of voter list 162*a*. For example, if the number of voters of Precinct List 162*a* that desire ballot file 165 is B, then the number of images corresponding to ballot file 165 in print file 167 is B, as shown in FIG. 9*f*. One example of a voter who desired ballot file 165 is the first voter (i.e. "Mike Doe") in voter list 162*b*, who desires a ballot for a Democrat of Precinct 2 printed in English.

Control program 163 flows print file 167 to a printer included with election ballot printing system 160 and the ballots are printed in response. It should be noted that print file 167 is printed as a single print job, instead of separate print jobs for the computer files corresponding to each ballot. By printing a single primary computer file instead of multiple computer files, the ballots are printed faster.

In some embodiments, control program 163 operates a camera which scans printed ballot 168. In these embodiments, control program 163 can compare the scan of printed ballot 168 with the corresponding selected ballot images of print file 167. An error indication is typically provided in response to an indication that the scan of printed ballot 168 does not match the corresponding selected ballot image of print file 167. The error indication can be displayed with a display monitor included with election ballot printing system 160. Control program 163 can store the error indication with a print audit file 170. Control program 163 can print, in response to the error indication, the selected ballot image of print file 167 that does not match the corresponding scan of printed ballot 168. Control program 163 can also provide a report of the printing of print file 167 for documentation purposes. These steps can be repeated until all the ballots desired are printed and there are no error indications. More information regarding reprinting ballots is provided above with FIG. 7.

It should be noted that, in some situations, it is desirable to print a single ballot. In these situations, a manual control signal 171 (FIG. 8) can be provided to control program 163, wherein manual control signal 171 provides an indication of the desired type of ballot it is desired to print. Manual control signal 171 can be provided to control program 163 in many different ways, such as by using a keyboard or computer mouse in communication with the computer of election ballot printing system 160. In response to manual control signal 171, the desired ballot image is selected from ballot repository and flowed to print file 167. Print file 167 is then printed so that printed ballot 168 is provided. In this way, election ballot printing system 160 can provide a ballot-on-demand.

In some embodiments, the single ballot is printed in response to selecting a single line in side file 169. For example, Ballot File 1.PDF of side file 169 can be printed in response to selecting Side File Line 1. In other embodiments, the single ballot is printed in response to selecting a single voter in a voter list, such as voter list 162*a* and 162*b*.

It should be noted that this feature, as well as others included herein, allow a voter to vote at any voting location that includes election ballot printing system 160. The voter can vote at any voting location that includes election ballot printing system 160 because system 160 can print a desired ballot on demand. Hence, a voter who lives in one city and works in another city, can vote in the city they work in if they have access to printing system 160. In this way, the voter is not required to leave work and travel to the city he or she lives in to vote. This is useful to decrease travel time and time away from work. This is also useful because more people are likely to vote if voting is more convenient.

Figure 10A:
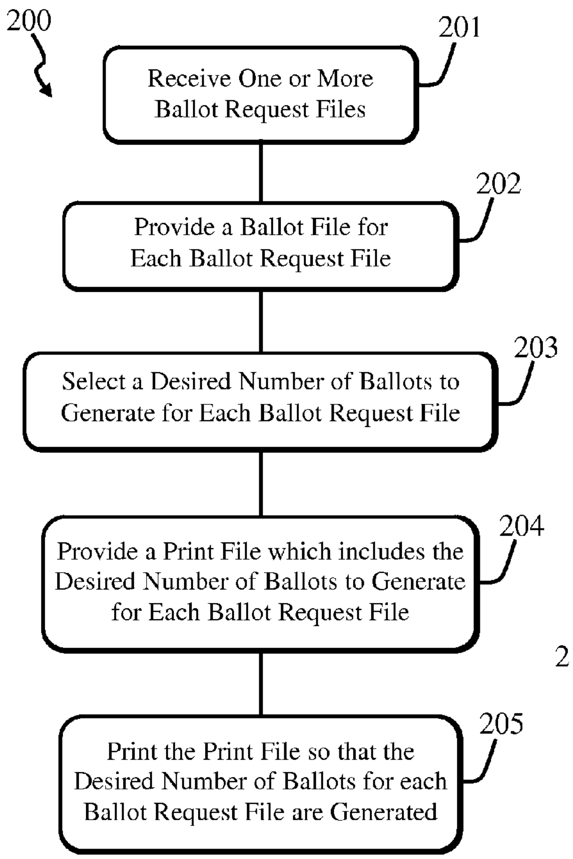
FIGS. 10*a*, 10*b* and 10*c* are embodiments of different methods of providing ballots.

FIG. 10*a* is a flow diagram of a method 200 of providing election ballots. In this embodiment, method 200 includes a step 201 of receiving one or more ballot request files. Method 200 includes a step 202 of providing a ballot file for each ballot request file. Method 200 includes a step 203 of selecting a desired number of ballots to generate for each ballot request file. Method 200 includes a step 204 of providing a print file which includes the desired number of ballots to generate for each ballot request file. Method 200 includes a step 205 of printing the print file so that the desired number of ballots for each ballot request file are generated.

It should be noted that method 200 can include many other steps. For example, in some embodiments, method 200 includes a step of providing a print audit file in response to printing the print file. Further, in some embodiments, method 200 includes a step of providing a report for each ballot request file.

In some embodiments, method 200 includes a step of scanning the printed ballots in response to the print file being printed. In these embodiments, method 200 can include a step of comparing the scan of the printed ballots with the print file. Further, in these embodiments, method 200 can include a step of providing an error indication in response to an indication that the print file does not correspond with the scan of the printed ballots.

Figure 10B:
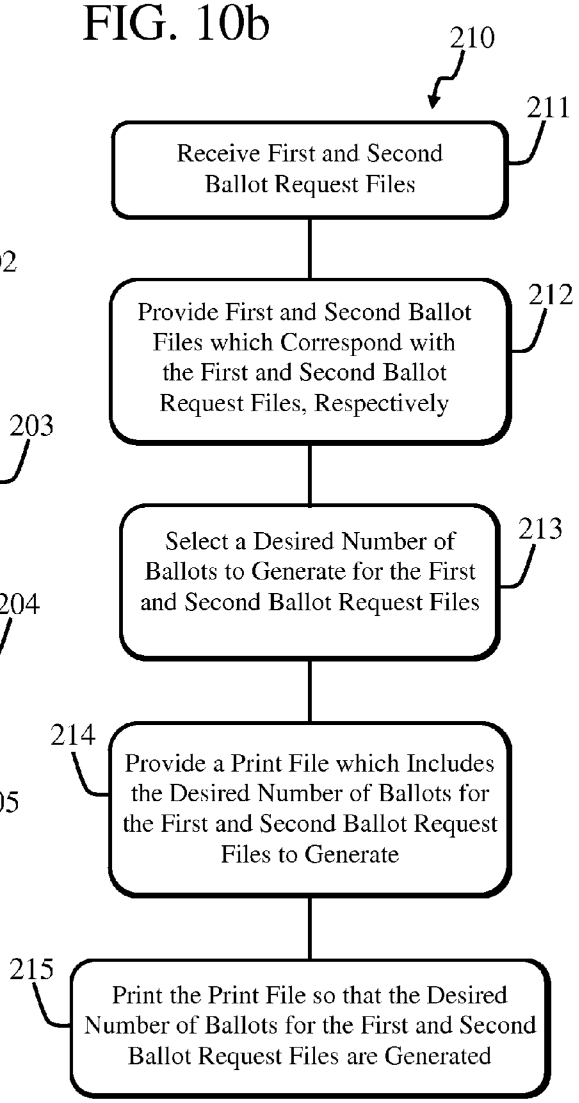

FIG. 10*b* is a flow diagram of a method 210 of providing election ballots. In this embodiment, method 210 includes a step 211 of receiving first and second ballot request files and a step 212 of providing first and second ballot files which correspond with the first and second ballot request files, respectively. Method 210 includes a step 213 of selecting a desired number of ballots to generate for the first and second ballot request files and a step 214 of providing a print file which includes the desired number of ballots for the first and second ballot request files to generate. Method 210 includes a step 215 of printing the print file so that the desired number of ballots for the first and second ballot request files are generated.

It should be noted that, in some embodiments, the print file can be the concatenation of the first and second ballot files. In these embodiments, the first ballot file is typically before the second ballot file in the print file. The first ballot file can be before the second ballot file in the print file in many different ways. For example, the first ballot file can be in the print file so that it is printed before the second ballot file when the print file is printed. However, it should be noted that the second ballot file can be printed before the first ballot file, if desired.

It should also be noted that method 210 can include many other steps. For example, in some embodiments, method 210 includes a step of receiving a third ballot request file and providing a third ballot file which corresponds with the third ballot request file. In these embodiments, method 210 can include a step of selecting a desired number of ballots to print for the third ballot request file. In these embodiments, the print file typically includes the desired number of ballots for the third ballot file.

Further, in these embodiments, the print file can be the concatenation of the first, second and third ballot files. It should be noted that the first, second and third ballot files can be concatenated in many different orders. For example, the first ballot file can be before the second ballot file and the second ballot file can be before the third ballot file. In another example, the third ballot file is before the first ballot file and the first ballot file is before the second ballot file. Further, in another example, the second ballot file is before the first ballot file and the first ballot file is before the third ballot file. Hence, the first, second and third ballot files can be in many different orders within the print file, and the particular order can be selected using the software.

Figure 10C:
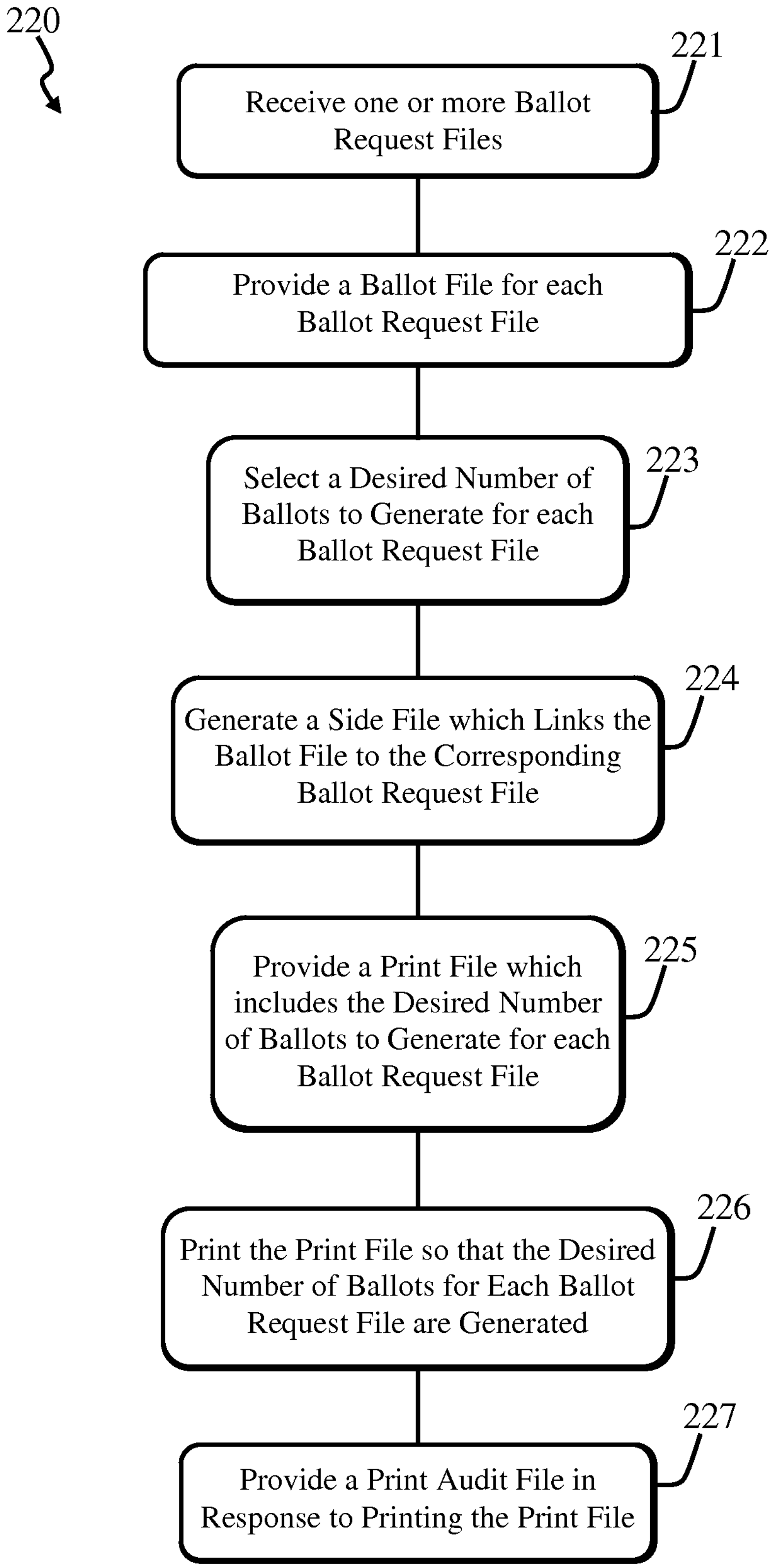

FIG. 10*c* is a flow diagram of a method 220 of providing election ballots. In this embodiment, method 220 includes a step 221 of receiving one or more ballot request files and a step 222 of providing a ballot file for each ballot request file. Method 220 includes a step 223 of selecting a desired number of ballots to generate for each ballot request file and a step 224 of generating a side file which links the ballot file to the corresponding ballot request file. Method 220 includes a step 225 of providing a print file which includes the desired number of ballots to generate for each ballot request file and a step 226 of printing the print file so that the desired number of ballots for each ballot request file are generated. Further, method 220 includes as step 227 of providing a print audit file in response to printing the print file.

It should be noted that method 220 can include many other steps. For example, in some embodiments, method 220 includes a step of providing each ballot file with an identification. The identification can be of many different types, such as indicia, which allows the ballot and/or ballot file to be identified. In some embodiments, the identification can be the arrangement of the fields included with the ballot. For example, most ballots have predetermined colors, precinct fields, party fields, as well as other fields, which allow them to be identified. Further, in some embodiments, the identification of the fields is their arrangement. For example, in some elections the precinct field can be arranged so that it is positioned proximate to the lower left corner of the ballot and, in other elections, the precinct field can be arranges so that it is positioned proximate to the upper right corner of the ballot. Hence, by knowing the arrangement for different elections, the identification of the ballot can be determined.

In some embodiments, method 220 includes a step of providing a report for each ballot request file. Further, in some embodiments, method 220 includes a step of providing the identification of each ballot file to the print audit file.

In some embodiments, step 222 includes a step of providing the ballot file for each ballot request file includes a step of file mapping. In these embodiments, the step of file mapping includes adjusting one or more fields in a ballot file in response to a vote by mail request. The field can be adjusted so that the fields of the ballot are in a desired arrangement.

Figure 11A:
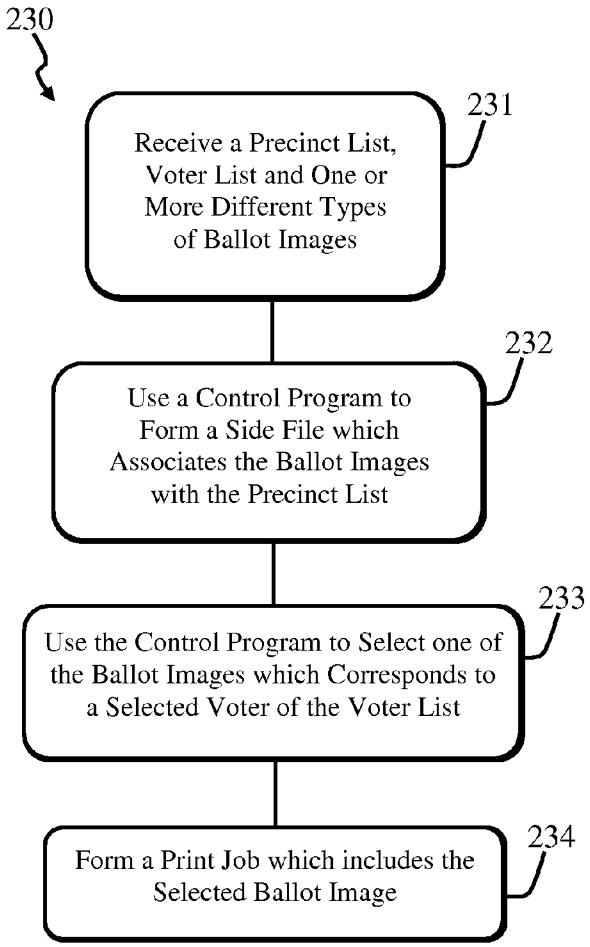
FIGS. 11*a*, 11*b* and 11*c* are embodiments of different methods of providing ballots.

FIG. 11*a* is a flow diagram of a method 230 of providing a ballot. In this embodiment, method 230 includes a step 231 of receiving a precinct list, voter list and one or more different types of ballot images. Method 230 includes a step 232 of using a control program to form a side file which associates the ballot images with the precinct list. Method 230 includes a step 233 of using the control program to select one of the ballot images which corresponds to a selected voter of the voter list. Method 230 includes a step 234 of forming a print job which includes the selected ballot image. In some embodiments, method 230 includes printing the selected ballot image on a ballot in response to printing the print job.

The control program can include a number of ballot images in the print job which corresponds with the number of voters included with the voter list. The control program forms the side file by associating a precinct from the precinct list with a corresponding ballot image. The control program stores an indication of the type of ballot which corresponds with a selected precinct of the precinct list in the side file. The control program selects the type of ballot image included with the print job in response to an indication from the side file. The control program selects the type of ballot image in response to a key identifier of the voter list.

Figure 11B:
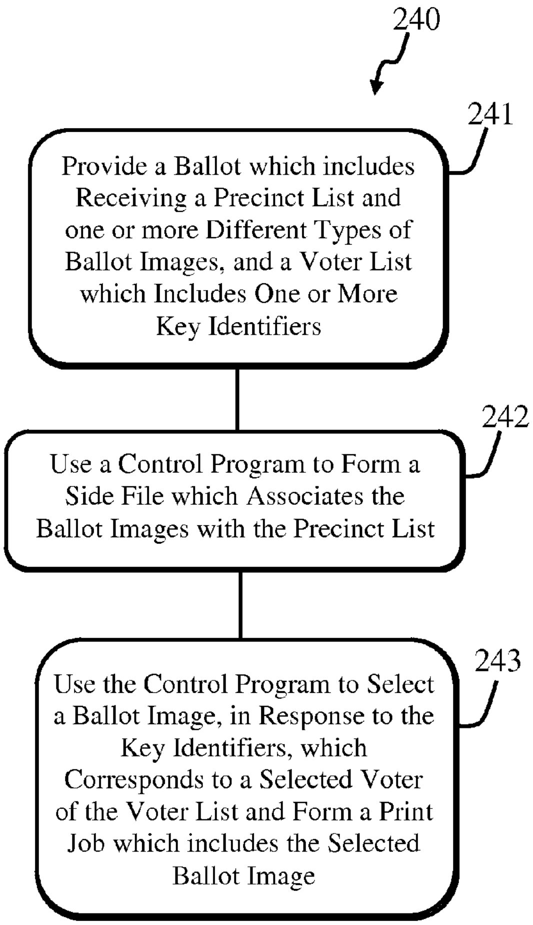

FIG. 11*b* is a flow diagram of a method 240 of providing a ballot. In this embodiment, method 240 includes a step 241 of providing a ballot which includes receiving a precinct list and one or more different types of ballot images, as well as a voter list which includes one or more key identifiers. Method 240 includes a step 242 of using a control program to form a side file which associates the ballot images with the precinct list. Method 240 includes a step 243 of using the control program to select a ballot image, in response to the key identifiers, which corresponds to a selected voter of the voter list and forming a print job which includes the selected ballot image.

The key identifiers are selected from a group of key identifiers which include a political party, precinct, residence, election type and language. The different types of ballot images correspond to ballots in different languages. The control program operates an election ballot printing system.

In some embodiments, method 240 includes printing the selected ballot image on a paper in response to printing the print job with the election ballot printing system. In these embodiments, the method can include scanning the printed ballot with the election ballot printing system.

Figure 11C:
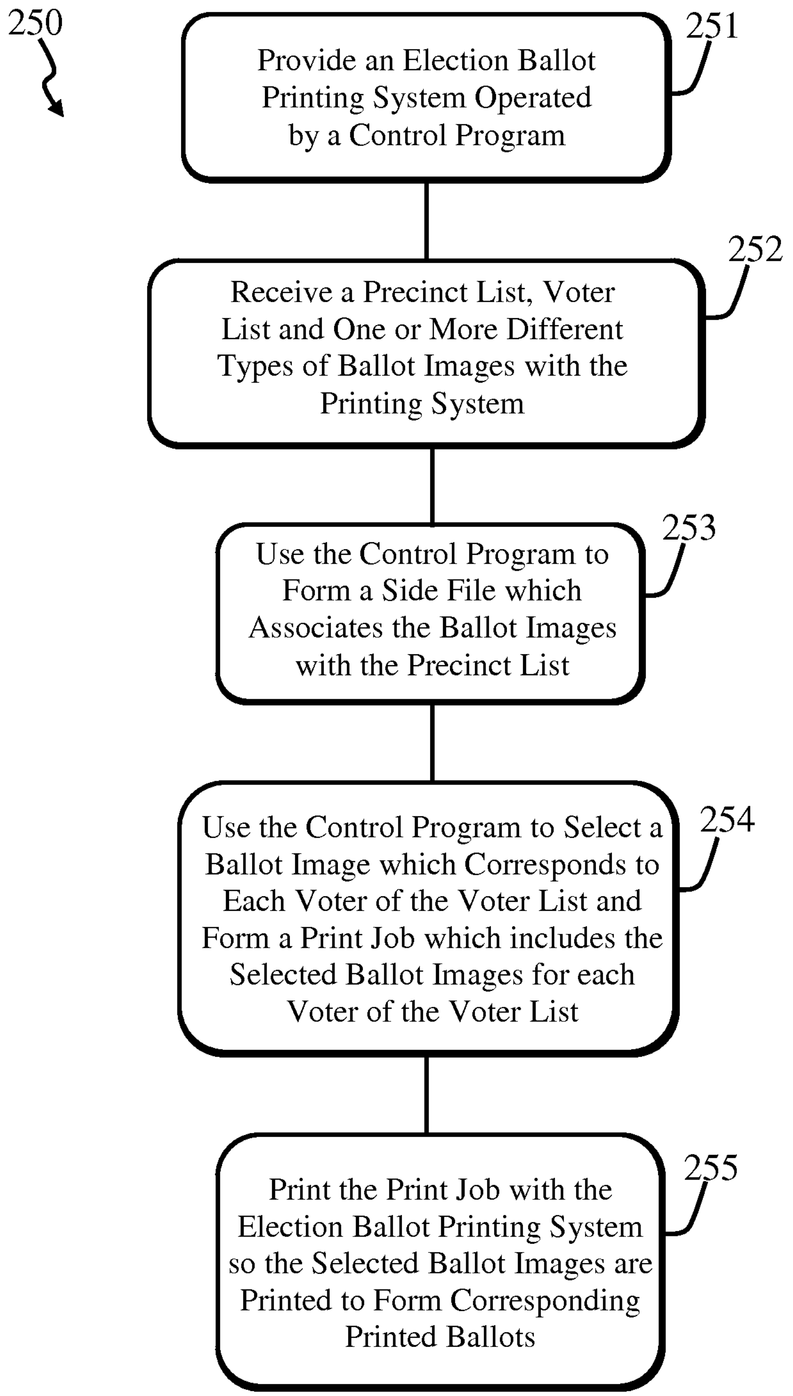

FIG. 11*c* is a flow diagram of a method 250 of providing a ballot. In this embodiment, method 250 includes a step 251 of providing an election ballot printing system operated by a control program. Method 250 includes a step 252 of receiving a precinct list, voter list and one or more different types of ballot images with the printing system. Method 250 includes a step 253 of using the control program to form a side file which associates the ballot images with the precinct list. Method 250 includes a step 254 of using the control program to select a ballot image which corresponds to each voter of the voter list and forming a print job which includes the selected ballot images for each voter of the voter list. Method 250 includes a step 255 of printing the print job with the election ballot printing system so the selected ballot images are printed to form corresponding printed ballots.

In some embodiments, method 250 includes scanning the printed ballots with the election ballot printing system. In these embodiments, method 250 can include comparing the scans of the printed ballots with the corresponding selected ballot images of the print job. An error indication can be provided in response to an indication that the scan of a printed ballot does not match the corresponding selected ballot image of the print job. The error indication can be displayed with the election ballot printing system. Method 250 can include storing the error indication in a print audit file. Method 250 can include printing, in response to the error indication, the selected ballot image of the print job that does not match the corresponding scan of its printed ballot.

Thus, the invention allows the correct ballot to be printed for each registered voter. Hence, it is no longer necessary to print a large number of ballots, most of which will be unused and discarded. As mentioned above, an unused ballot corresponds to an unmarked ballot. Further, the election ballot printing system can be located at the different voting sites to reduce the need to distribute ballots before the election. This reduces the difficulty and amount of time necessary to distribute ballots. Election ballot printing system allows the correct ballot for a voter to be printed on demand, so it is no longer necessary to keep an inventory of ballots at the voting site and then locate the correct ballot for the voter. The ballot-on-demand feature of the election ballot printing system ensures that the correct ballot will be available for each voter so that fewer voters will be turned away because of the inability to locate or provide the correct ballot.

The embodiments of the invention described herein are exemplary and numerous modifications, variations and rearrangements can be readily envisioned to achieve substantially equivalent results, all of which are intended to be embraced within the spirit and scope of the invention.

The invention claimed is:

1. A method of using an election ballot printing system, comprising:

associating one or more different types of ballot images with a voter list using a side file;

accessing the side file using a control program and selecting a ballot image which corresponds to a selected voter of the voter list;

forming a print job which includes the selected ballot image;

printing the print job to form a printed unused ballot which includes the selected ballot image;

scanning the printed unused ballot with a scanner located at an output of the election ballot printing system;

comparing the scan of the printed ballot with the corresponding selected ballot image of the print job;

providing an error indication in response to an indication that the scan of the printed ballot does not match the corresponding selected ballot image of the print job;

creating a reprint file for reprinting ballots having an error indication; and storing the error indication in a print audit file.

2. The method of claim 1, further including displaying the error indication with a display device.

3. The method of claim 1, further including printing, in response to the error indication, the selected ballot image of the print job that does not match the corresponding scan of the printed ballot.

4. A method of using an election ballot printing system, comprising:

receiving a voter list;

receiving a plurality of different types of ballot images;

using a control program to form a side file which associates the ballot images with the voter list, wherein the control program selects a ballot image which corresponds to a selected voter of the voter list;

forming a print job which includes the selected ballot image;

printing the print job to form an unused ballot which includes the selected ballot image;

comparing an image of the unused ballot captured by a scanner located at an output of the election ballot printing system with the selected ballot image;

providing an error indication in response to an indication that a scan of the image of the unused ballot does not match the corresponding selected ballot image of the print job;

creating a reprint file for reprinting ballots having an error indication; and storing the error indication in a print audit file.

5. The method of claim 4, further including providing print output information in response to scanning the unused ballot.

6. The method of claim 5, further including providing an error indication in response to the print output information not corresponding to expected output information.

7. The method of claim 6, wherein the expected output information corresponds to information of the selected ballot image.

8. The method of claim 4, further including displaying the error indication with a display device.

9. The method of claim 4, further including printing, in response to the error indication, the selected ballot image of the print job that does not match the corresponding scan of the image printed ballot.

10. A method of using an election ballot printing system, comprising:

forming a side file with a control program, wherein the side file associates first and second different types of ballot images with voters of a voter list;

selecting a ballot image, wherein the selected ballot image corresponds to a selected voter of the voter list;

forming a print job which includes the selected ballot image;

printing the print job to form a first unused ballot which includes the selected ballot image;

scanning the first unused ballot with a scanner located at an output of the election ballot printing system, in response to printing the print job, to form a first scanned ballot image;

comparing the first scanned ballot image with the selected ballot image; providing print output information in response to scanning the first unused ballot;

providing an error indication in response to an indication that the first scanned ballot image does not match the corresponding selected ballot image of the print job;

creating a reprint file for reprinting ballots having an error indication; and storing the error indication in a print audit file.

11. The method of claim 10, further including providing an error indication in response to the print output information not corresponding to expected output information.

12. The method of claim 11, wherein the expected output information corresponds to information of the selected ballot image.

13. The method of claim 10, further including providing an error indication in response to an indication that the first scanned ballot image does not match the corresponding selected ballot image of the print job.

14. The method of claim 10, further including displaying the error indication with a display device.

15. The method of claim 10, further including printing, in response to the error indication, the selected ballot image of the print job that does not match the corresponding scanned ballot image.

16. The method of claim 10, further including forming a second unused ballot, wherein the selected ballot image includes the first type of ballot image, and the second unused ballot includes a second type of ballot image.

17. The method of claim 16, further including providing print output information in response to scanning the second unused ballot.

18. The method of claim 17, further including providing an error indication in response to the print output information not corresponding to expected output information, wherein the expected output information corresponds to information of the second type of ballot image.

* * * * *